Figure 1:
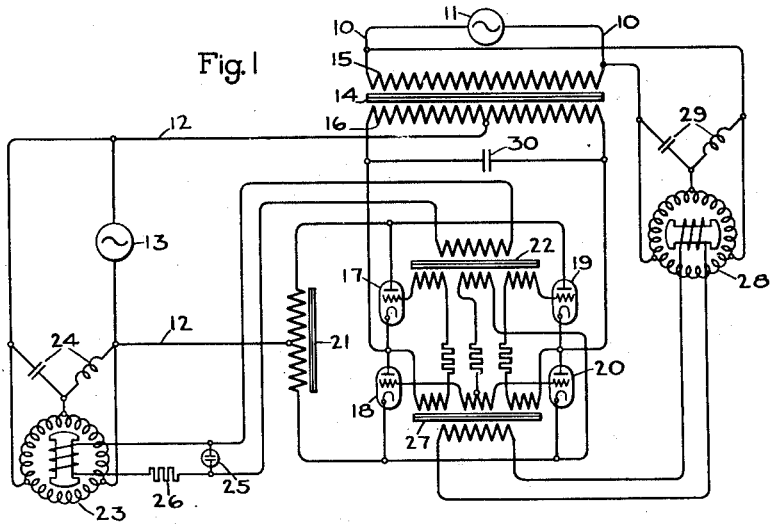

Oct. 10, 1933.  B. D. BEDFORD  1,930,303
ELECTRIC VALVE CONVERTING SYSTEM
Filed Jan. 12, 1932    4 Sheets-Sheet 1

Inventor:
Burnice D. Bedford,
by Charles E. Tullar
His Attorney.

Oct. 10, 1933.   B. D. BEDFORD   1,930,303
ELECTRIC VALVE CONVERTING SYSTEM
Filed Jan. 12, 1932   4 Sheets-Sheet 2

Inventor:
Burnice D. Bedford,
by *Charles E. Tullar*
His Attorney.

Oct. 10, 1933.  B. D. BEDFORD  1,930,303
ELECTRIC VALVE CONVERTING SYSTEM
Filed Jan. 12, 1932   4 Sheets-Sheet 3

Inventor:
Burnice D. Bedford,
by Charles E. Tullar
His Attorney.

Oct. 10, 1933.  B. D. BEDFORD  1,930,303
ELECTRIC VALVE CONVERTING SYSTEM
Filed Jan. 12, 1932   4 Sheets-Sheet 4

Inventor:
Burnice D. Bedford,
by Charles E. Tullar
His Attorney.

Patented Oct. 10, 1933

1,930,303

UNITED STATES PATENT OFFICE 1,930,303

ELECTRIC VALVE CONVERTING SYSTEM

Burnice D. Bedford, Schenectady, N. Y., assignor to General Electric Company, a corporation of New York Application January 12, 1932. Serial No. 586,107

22 Claims. (Cl. 172—281)

My invention relates to electric valve converting systems and more particularly to such systems adapted to transmit energy between alternating current circuits of different frequencies.

Heretofore there have been devised various electric valve converting apparatus for transmitting energy between alternating-current circuits of different frequencies. The use of electric valves of the vapor electric discharge type in such apparatus has been found particularly advantageous because of the relatively large amounts of power which may be handled at ordinary operating voltages. In such valve converting apparatus it is customary to supply a pair or pairs of electric valves oppositely disposed with respect to the load circuit, which serve to alternately supply the positive and negative half cycles of the load current. When using valves of the vapor electric discharge type in this type of apparatus, it has not heretofore been possible to supply loads having substantial lagging power factors because of the fact that the load current would persist through one of the rectifier valves after the other rectifier valve was made conductive, with the result that the alternating-current supply circuit would be short circuited.

It is an object of my invention, therefore, to provide an improved electric valve converting system for transmitting energy between alternating-current circuits of different frequencies which will overcome the above mentioned disadvantages of the arrangements of the prior art and which will be simple and reliable in operation.

It is another object of my invention to provide an improved electric valve converting system for transmitting energy between alternating-current circuits of different frequencies which is suitable for supplying loads of lagging power factor.

It is a further object of my invention to provide an improved electric valve converting system for transmitting energy between alternating-current circuits of different frequencies and improved grid excitation circuits therefor by means of which a short circuit due to operation of the apparatus under non-unity power factor conditions will be eliminated.

In accordance with my invention, alternating-current circuits of different frequencies are interconnected through a group or groups of electric valves oppositely disposed with respect to the load circuit, said valves preferably being of the vapor electric discharge type. The circuits of different frequencies will be referred to hereafter as the higher frequency circuit and the lower frequency circuit, respectively, but it is to be understood that the terms higher and lower are used only in a relative sense and that my invention is not limited to any particular order of magnitude for the frequencies of the respective circuits. Corresponding valves of the several groups are periodically rendered conductive at the frequency of the lower frequency circuit so that corresponding valves of the several groups transmit energy between the circuits during positive half cycles of the lower frequency circuit and the other valves of the groups transmit energy between the circuits during the negative half cycles of the lower frequency circuit. During the intervals when one valve of each group is acting as a rectifier, the other valve or valves of each group are excited for inverter operation at the frequency of the higher frequency circuit. With this arrangement, when operating under non-unity power factor conditions and during those portions of the cycle when the load current tends to flow with the counter-electromotive force of the load circuit, the current is enabled to flow back to the supply circuit by means of the several valves excited as an inverter. In accordance with certain modifications of my invention, improved grid excitation circuits for the several electric valves are provided to eliminate the possibility of short circuits on either the load or supply circuits.

Figure 2:
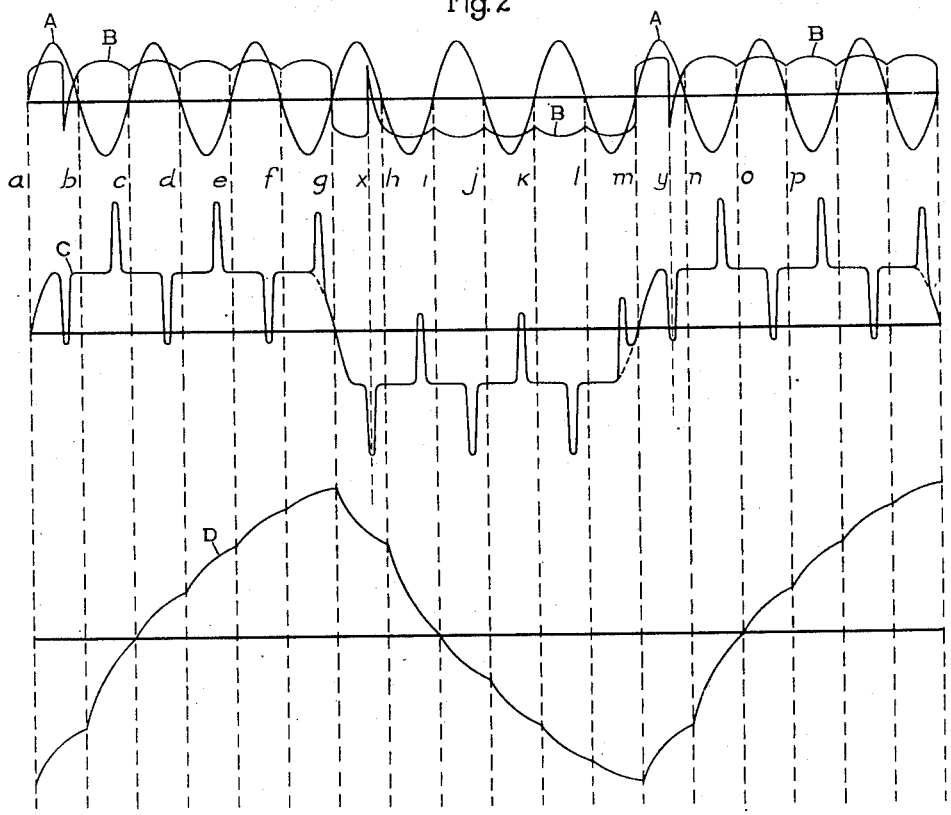
Figure 3:
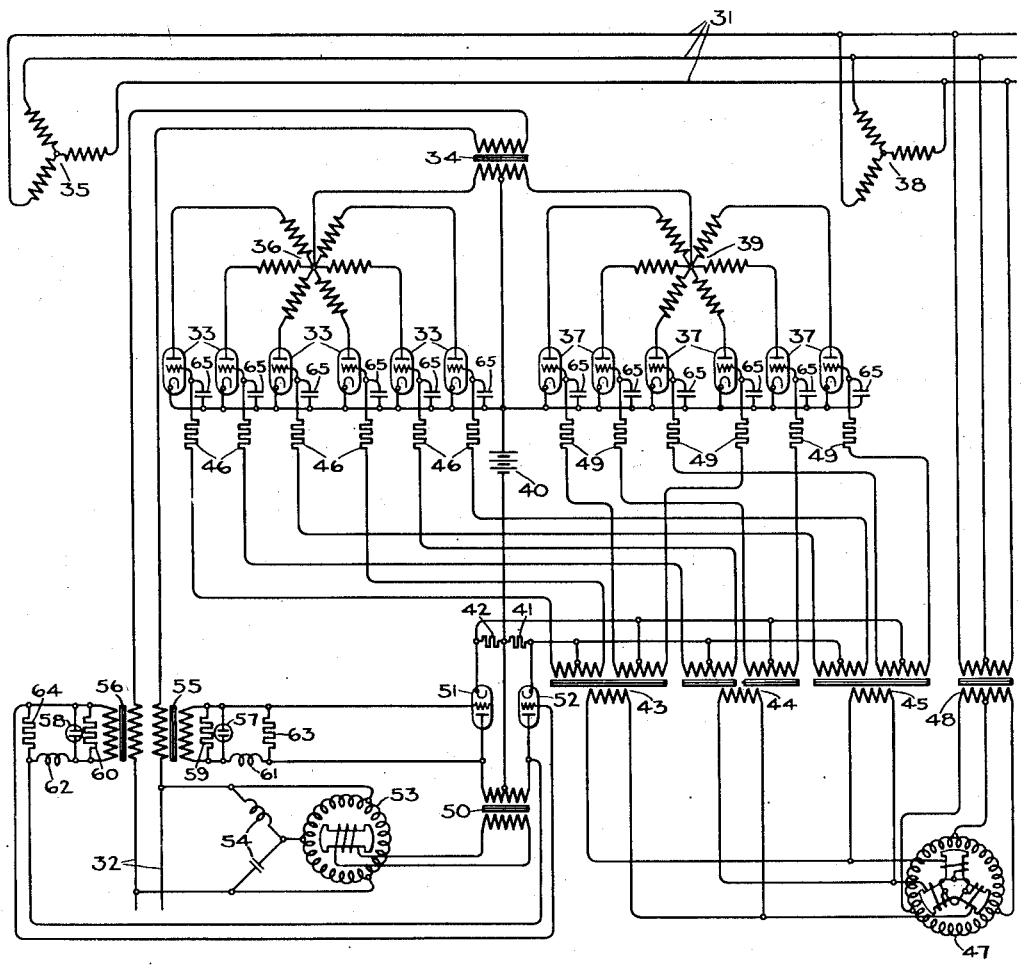
Figure 4:
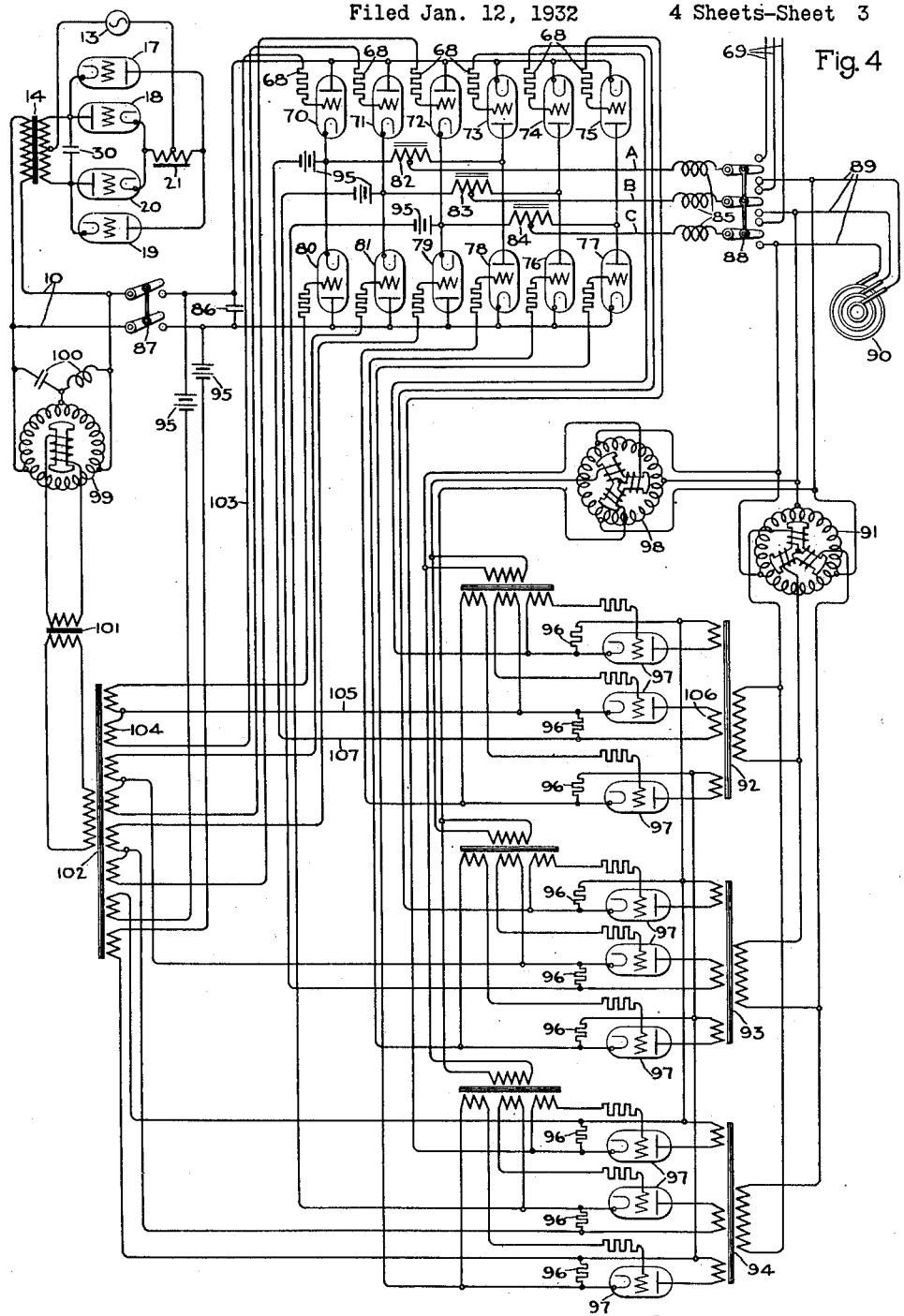
Figure 5:
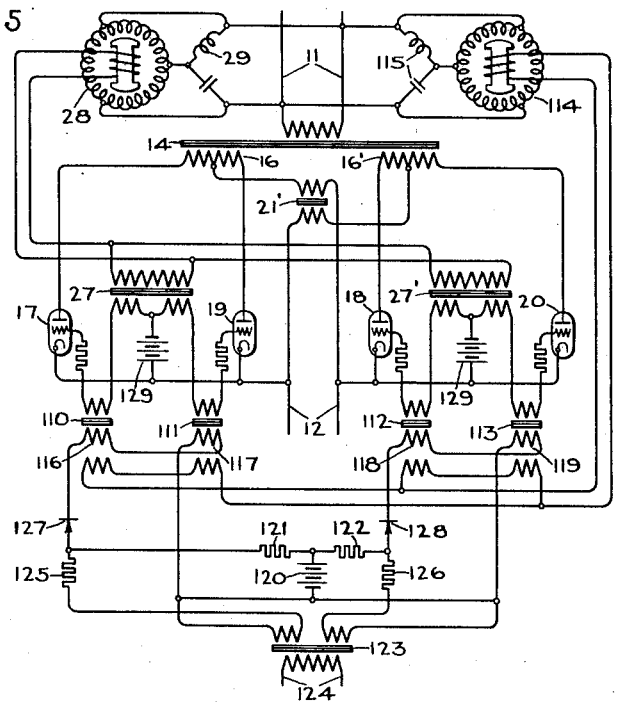
Figure 6:
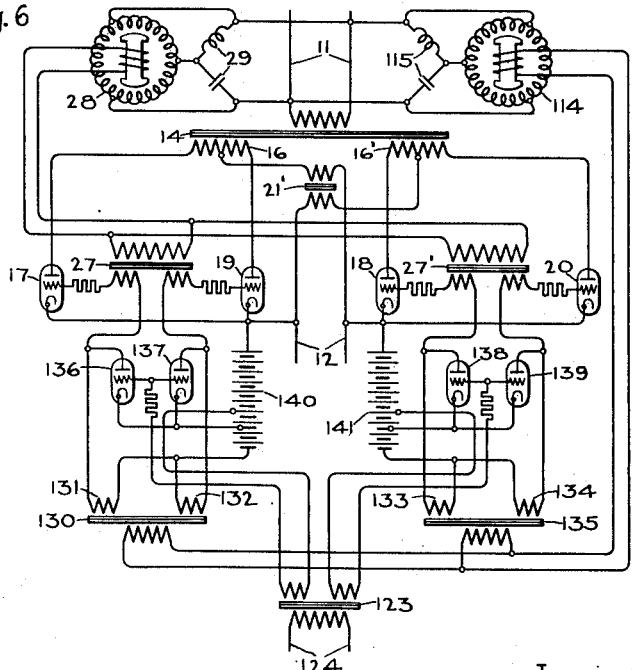

For a better understanding of my invention together with other and further objects thereof, reference is had to the following description taken in connection with the accompanying drawings, and its scope will be pointed out in the appended claims. In the drawings, Fig. 1 illustrates an apparatus embodying my invention for transmitting energy between two single-phase alternating-current circuits of different frequencies; Fig. 2 represents certain operating characteristics of the arrangement of Fig. 1 to aid in the understanding of my invention; Fig. 3 shows an extension of my invention to an arrangement for transmitting energy from a three-phase alternating-current circuit of higher frequency to a single-phase alternating-current circuit of lower frequency; Fig. 4 illustrates an arrangement of transmitting energy from a source of single-phase alternating current of constant frequency to a three-phase alternating current-circuit of variable frequency in which the energy is converted through an intermediate stage of higher frequency single-phase alternating current; while Figs. 5 and 6 show certain improved grid excitation circuits for the electric valves of a valve converting system for transmitting energy between single-phase alternating-current circuits of different frequencies.

Referring now to Fig. 1, I have illustrated an arrangement for transmitting energy between a higher frequency alternating-current circuit 10 and a lower frequency alternating-current circuit 12, one or both of which must be connected to independent sources of electromotive force 11 and 13, respectively. This apparatus comprises a transformer 14 having a winding 15 connected to the circuit 10 and a winding 16 provided with an electrical midpoint connected to one side of the circuit 12 and with two end terminals connected to the other side of the circuit 12 through two pairs of electric valves 17 and 18, and 19 and 20, respectively, oppositely connected with respect to the low frequency circuit through opposite halves of a midtapped reactor 21. The several valves 17—20 inc., are each provided with an anode, a cathode and a control grid, and may be of any of the several types well known in the art, although I prefer to use valves of the vapor electric discharge type. In order to transfer the load current between the valves of each pair, the grids of the several electric valves are energized with a component of the lower frequency excitation from the circuit 12 through a grid transformer 22 and a suitable phase shifting device, such as a rotary phase shifting transformer 23, and phase splitting arrangement 24. As will be explained hereinafter, it is most desirable to have a lower frequency grid excitation of substantially rectangular wave form. This may be obtained by connecting across the grid excitation circuit a constant voltage device, such for example, as a glow tube 25 adapted to maintain a voltage substantially less than the amplitude of the grid excitation. A current limiting resistor 26 is preferably connected in series therewith to protect the secondary member of the rotary phase shifting transformer 23. In order to transfer the load current between the corresponding valves of the two pairs when transmitting energy from the low-frequency circuit to the high-frequency circuit, or when transmitting energy in the reverse direction and operating under non-unity power factor conditions on the lower frequency circuit, the grids of the several electric valves are also energized with a component of the higher frequency excitation derived from the circuit 10 through a grid transformer 27 and a rotary phase shifting transformer 28 energized from the circuit 10 through a suitable phase splitting arrangement 29. The grid transformer 27 should be self-saturating or some other means for converting the sinusoidal grid excitation into one of peaked wave form should be provided so that the high-frequency component of excitation shall consist of a series of impulses of short duration and of sufficient amplitude to overcome the lower frequency excitation when they are of opposed polarities. However, this feature of supplying an electric valve with a periodic grid potential of peaked wave form comprises no part of my present invention, but is disclosed and broadly claimed in my co-pending application, S. N. 485,335, filed September 29, 1930. In case it is desired to transmit energy from the lower frequency circuit to the higher frequency circuit and the higher frequency circuit 10 is not connected to an independent source of electromotive force, a commutating capacitor 30 must be connected across the terminals of the winding 16.

The operation of the above described apparatus when transmitting energy from the higher frequency circuit 10 to the lower frequency circuit 12 will be considered first. Under these conditions, if it is desired to transmit energy to the alternating current circuit 12 at unity power factor, the higher frequency excitation provided by the grid transformer 27 may be neglected since it is only necessary to render the valves 17 and 19, and 18 and 20 alternately conductive at the frequency of the circuit 12. For example, during the first half cycle of the lower frequency potential, energy is transmitted to the circuit 12 by means of the transformer 14 and electric valves 17 and 19 comprising the equivalent of a rectifier, the direct-current circuit of which comprises the upper half of reactor 21 and the alternating-current circuit 12. During the next successive half cycle of lower frequency alternating potential, electric valves 18 and 20 are rendered conductive and unidirectional current of an opposite polarity is supplied to the circuit 12 through the lower portion of reactor 21. The reactor 21 serves to smooth out the ripple of the rectified voltage supplied to the lower frequency circuit and also to limit any short-circuit current on the higher frequency circuit in case one pair of rectifying valves is excited before the other has ceased to conduct current. Therefore the reactance of this element should be relatively high with respect to the higher frequency circuit, but it should be relatively low with respect to the lower frequency circuit so as not to impede the transfer of current from one pair of rectifying valves to the other at the low frequency.

However, if a lagging power factor current is being supplied to the lower frequency circuit 12, current will not reverse at the instant at which the rectifier excitation of one pair of valves is removed and the other pair is excited for rectifier operation, but will persist in one of the electric valves, for example valve 19, and will flow with the counter-electromotive force of the load circuit and against the elecromotive force of the portion of the winding 16 associated therewith during the next successive half cycle of higher frequency potential. If the current is allowed to continue in this valve it will operate as a rectifier again during the next successive half cycle and the apparatus will tend to go into short circuit. Certain operating characteristics for the arrangement of Fig. 1 when operating under lagging power factor conditions on the lower frequency circuit are illustrated in Fig. 2. In this figure the curve A represents the higher frequency alternating potential of the circuit 10; the curve B the potential impressed upon the circuit 12 by means of the valve converting apparatus; the curve C the resultant grid excitation impressed upon the grids of one of the electric valves, for example, valve 19, and the curve D the lower frequency current flowing in the circuit 12. Considering the operation of the apparatus from the instant c and assuming that valve 17 is initially made conductive, it will be seen that during the interval c—g valves 17 and 19 will act as a full-wave rectifier, being conductive for alternate half cycles of the higher frequency current. At the instant g it is desired to reverse the polarity of the potential applied to the circuit 12, but, due to the reactance of this circuit, the current will not reverse immediately and will continue to flow in the last valve, that is, in valve 19. For example, during the interval f—g valve 19 is conducting current and the right hand terminal of the winding 16 is negative, the valve 19 acting as a rectifier. During the interval *g—h* the reactance of the circuit 12 forces the current to continue through the valve 19, since, in the meantime, electric valve 17 has become non-conducting, and the current flows against the electromotive force of the right hand portion of the winding 16, the lower frequency current thus decreasing as indicated in curve D. If, however, the valve 19 should be allowed to continue to conduct current during the interval *h—i*, it would be operating again as a rectifier tending to build up the lower frequency current and also tending to send a short-circuit current through electric valve 19, reactor 21, and electric valve 18, which is now excited for rectifier operation, and the transformer winding 16. In order to avoid such a short circuit electric valves 17 and 19 are excited for inverter operation during the half cycle of lower frequency potential when they are not operating as a rectifier. By means of the phase shifting transformer 28, the peaked excitation for inverter operation is slightly advanced in phase as indicated, so that the current is transferred from the valve 19 to the valve 17 at the point *x*, thus flowing against the counter-electromotive force of the left hand portion of the winding 16 during the interval *x—i*. At the point *i* the lower frequency current has been reduced to zero and the valves 18 and 20 now operate as a rectifier to supply the next successive low frequency half cycle. Similarly during the interval *m—o* the valves 18 and 20 are excited for inverter operation and transmit energy back to the higher frequency circuit 10. It is now seen that the lower frequency grid excitation should have a substantially rectangular wave form so that, combined with the high frequency peaked excitation, corresponding valves of the pairs act successively as rectifiers or inverters. In case the lower frequency circuit 12 is supplied with a source of counter-electromotive force 13, it will be apparent that the power factor of current delivered to the circuit 12 will be dependent upon the phase relation of the lower frequency grid excitation, which may be adjusted by means of the rotary phase shifting transformer 23. In case the lower frequency circuit is not connected to an independent source of electromotive force, it will be apparent that the power factor thereon will be determined solely by its load characteristics.

The above described apparatus may also be used to transmit energy from the lower frequency circuit 12 to the higher frequency circuit 11. In this arrangement electric valves 17 and 19 together with the winding 16 will act as an inverter during one half cycle of the lower frequency potential, while the valves 18 and 20 and the winding 16 will act as an inverter during half cycles of lower frequency potential of an opposite polarity. In case the higher frequency circuit 10 is connected to a source of independent electromotive force 11, it will be obvious that this electromotive force may be utilized to commutate the current between the valves 17 and 19 and 18 and 20, respectively, by suitably advancing the phase of the higher frequency grid excitation through the rotary phase shifting transformer 28. However, in case the circuit 10 is not connected to an independent source of electromotive force, a commutating capacitor 30 may be connected as illustrated and will be effective to commutate the current between the several valves.

In Fig. 3 there is illustrated an extension of my invention to an arrangement for transmitting energy from a three-phase higher frequency alternating-current circuit 31 to a single-phase lower frequency alternating-current circuit 32. This apparatus comprises two six-phase rectifiers, one consisting of six electric valves 33 adapted to energize one half of the primary winding of the output transformer 34 from the circuit 31 through a transformer comprising a primary winding 35 connected to the alternating-current circuit 31, and a six-phase secondary winding 36. The other rectifier comprises the six electric valves 37 adapted to energize the other half of the primary winding of transformer 34 from the circuit 31 through a transformer comprising a three-phase primary winding 38 connected to circuit 31 and a six-phase secondary winding 39. Each of the several electric valves 33 and 37 is provided with an anode, a cathode and a control grid and may be of any of the several types well known in the art although I prefer to use valves of the vapor electric discharge type. The grids of the several electric valves of each rectifier are excited for inverter operation during alternate half cycles of the lower frequency circuit in which the other rectifier is operating as such, as in the arrangement of Fig. 1. In order to provide this inverter excitation, the control grids of the several electric valves 33 are connected to their common cathode circuit through a negative bias battery 40, a resistor 41, the appropriate secondary windings of grid transformers 43, 44, and 45, and current limiting resistors 46. Similarly, the control grids of the valves 37 are connected to their common cathode circuit through bias battery 40, resistor 42, appropriate secondary windings of grid transformers 43, 44, and 45, and current limiting resistors 49. As in the arrangement of Fig. 1 the transformers 43, 44, and 45 are of the self-saturating type in order to supply grid excitation of peaked wave form. The primary windings of these transformers are energized through a three-phase rotary phase shifting transformer 47 and a potential transformer 48 from the higher frequency alternating-current circuit 31. In order to excite the groups of valves 33 and 37 alternately for rectifier operation to supply the successive half cycles of lower frequency current, the resistors 41 and 42 are included in rectifier circuits comprising a transformer 50 and electric valves 51 and 52 respectively, the half wave rectified current in these resistors producing a potential drop thereacross sufficient to overcome the potential of the negative bias battery 40 and render one group of valves or the other completely conductive for rectifier operation. The primary winding of the transformer 50 may be energized from the lower frequency circuit 32 through a rotary phase shifting transformer 53 and a phase splitting device 54 by means of which the phase relation of the current supplied to the lower frequency circuit may be regulated. In this polyphase arrangement, however, it has been found that the mere excitation of one group of valves for inverter operation is not sufficient to prevent short circuits in case of non-unity power factor conditions on the lower frequency circuit. In order to avoid such short circuits there is provided means for positively holding off the rectifier excitation of one group of valves until current has ceased to flow in the other group. This means comprises series transformers 55 and 56 connected in the lower frequency circuit 32, the secondary windings of which excite the grids of the valves 51 and 52. The connections are such that, so long as current is flowing in one group of valves, for example, the group of valves 33, the secondary potential of the series transformer 55 is negative and impresses a negative bias upon the grid of the valve 51 to maintain it non-conducting. With no current flowing through resistor 42, the negative bias battery 40 holds off the rectifier excitation of the group of valves 37. However, when the current in the first mentioned rectifier group passes through zero the negative bias on the valve 51 is removed and the valve 51 becomes conducting and supplies current through resistor 42 of such a magnitude as to overcome the negative bias of the battery 40 and to excite the several electric valves 37 for rectifier operation. In order to maintain the magnitude of the grid potentials of the valves 51 and 52 within predetermined limits irrespective of the variations in the load current of the circuit 32 there is preferably connected across the secondary windings of the transformers 55 and 56 constant potential devices such as glow tubes 57 and 58, and if desired, loading resistors 59 and 60, respectively. In case a certain margin of safety is desired with the apparatus operating under inductive load, the negative bias on the valves 51 and 52 may be somewhat extended by connecting reactors 61 and 62, respectively, in their grid circuits, and resistors 63 and 64 thereacross in order to provide a closed circuit for the lagging current supplied by the reactor. In the operation of the above described apparatus it has been found that occasionally potentials are electrostatically induced upon the control grids of one or more of the valves by potential transients occurring in the system upon the transfer of current between the several electric valves. These induced potentials are due to the electrostatic capacity between the grids and anodes of the several electric valves and in some instances may be sufficient to overcome the negative bias of the battery 40 and to render the valves conductive at an instant when they should be maintained non-conductive. This is particularly true when operating from high voltage circuits. In such instances, it may be desirable to connect capacitors 65 between the grid and cathode of each of the several electric valves. However, this feature of eliminating electrostatically induced potentials upon the grid of vapor electric discharge valves forms no feature of my present invention, but is disclosed and broadly claimed in a co-pending application of Alan Howard, Serial No. 566,376, filed October 1, 1931, and assigned to the same assignee as the present application.

The principles of operation of the above described apparatus will be well understood in view of the explanation given in connection with Fig. 1. In brief, the two groups of electric valves 33 and 37, together with their associated transformer windings 36 and 39, respectively, alternately supply a series of rectified high frequency impulses to form the successive half cycles of lower frequency current of opposite polarity. During the interval in which one group of valves is operating as a rectifier, the other group of valves is excited for inverter operation in order to take care of lagging and leading currents on the lower frequency circuit as explained in connection with Fig. 1. The valves are alternately excited for rectifier operation by alternately producing a bias in resistors 41 and 42 of sufficient magnitude to overcome the negative bias battery 40, this bias being produced by means of the rectifier comprising the transformer 50 and electric valves 51 and 52 respectively. As long as current continues to flow in the lower frequency circuit through either group of rectifier valves 33 or 37, a negative bias potential is impressed upon the grid of one of the valves 51 or 52 to hold off the positive bias supplied to resistors 41 or 42 and thus prevent both groups of valves operating as rectifiers at the same instant, which would produce a short circuit on the alternating current circuit 31. As stated above, a margin of safety may be provided by somewhat extending the negative grid excitation of the valves 51 and 52 by means of reactors 61 and 62 respectively, thus further insuring that the two sets of valves 33 and 37 shall not be conductive at the same instant.

In Fig. 4 there is illustrated an embodiment of my invention in an apparatus for transmitting energy from a source of lower frequency alternating current 13 of fixed frequency to an alternating-current circuit 69 of fixed or variable frequency. It has been found that the conversion of alternating current of a fixed frequency to alternating current of a variable frequency is accomplished most easily when the supply frequency is relatively high with respect to the maximum frequency of the load circuit. On the other hand the commercial frequencies available are generally of the same order of magnitude as the variable frequencies which it is desired to supply. In the arrangement of Fig. 4, therefore, the single-phase alternating current supplied by the source 13 is first converted to single-phase current of a higher frequency by an arrangement similar to that illustrated in Fig. 1 and this higher frequency single-phase alternating current is reconverted into three-phase variable frequency alternating current. Therefore I have provided an arrangement of the type illustrated in Fig. 1 for converting lower frequency alternating current supplied by the source 13 to an intermediate higher frequency alternating current which is supplied to the circuit 10 and this higher frequency alternating current is converted into a variable lower frequency polyphase alternating current by means of the apparatus comprising electric valves 70—81 inclusive, and the reactors 82, 83, and 84, each provided with an electrical midpoint to which are connected the several phases of the load circuit 69. The connections are such that each terminal of the load circuit 69 is connected to each terminal of the intermediate circuit 10 through a pair of oppositely disposed electric valves. As in the above described arrangement, the valves 70—81 inclusive, are each provided with an anode, a cathode and a control grid and are preferably of the vapor electric discharge type. Reactors 85 are preferably included in the several phases of the alternating-current circuit 69 and a capacitor 86 is preferably connected across the higher frequency circuit to aid in commutation as will be explained more fully below. Disconnecting switches 87 and 88 may also be provided in the higher frequency and lower frequency circuits, respectively, if desired. As in the above described arrangements, the control grid of each of the several electric valves is provided with a component of lower frequency excitation in order to effect the rectification of the higher frequency alternating current which is supplied to the various phases of the alternating current 69, and a component of higher frequency excitation of peaked wave form to excite those valves which are not acting as rectifiers for inverter operation in order to permit operation under non-unity power factor conditions on the lower frequency circuit 69. The lower frequency component of grid excitation is provided from a three-phase alternating-current circuit 89, the frequency of which is fixed or varied in accordance with the desired frequency variations of the circuit 69, energized from an alternating-current generator 90. The generator 90 may be either a pilot generator for supplying the grid excitation of the apparatus or it may be an independent alternator connected to the circuit 89, in which case energy may be fed to this circuit by operating the switch 88 to its lower position. The grid transformers 92, 93, and 94 are energized from the several phases of the circuit 89 through a rotary phase shifting transformer 91. As in the arrangement of Fig. 3 the grids of each of the several electric valves 70—81, inclusive, are energized with a source of negative bias potential from one of the several bias batteries 95, which are effective to prevent the operation of the valves as rectifiers. The several windings of the grid transformers 92, 93, and 94 are connected to energize each of the several resistors 96 with a unidirectional bias potential, which is opposed to that of the bias batteries 95, through electric valves 97, preferably of the vapor electric discharge type. In order to provide for operation under non-unity power factor conditions and to avoid the possibility of short circuits occasioned by the simultaneous excitation of opposed groups of valves as rectifiers, there is provided means for holding off the rectifier excitation of each group of valves comprising the bias potential across resistors 96. This control of the rectifier excitation may be obtained by controlling the grid potentials of the several valves 97, as for example, by exciting these control grids from the circuit 89 through an independent rotary phase shifting transformer 98. By properly adjusting the phase relation of the rotary phase shifting transformers 91 and 98, valves 97 may be made conductive for any desired portion of the cycle of electromotive force of the circuit 89, so that the corresponding electric valves of the groups 70—81 inclusive, will be excited for rectifier operation only during this period. The higher frequency component of grid excitation of peaked wave form may be supplied from the intermediate higher frequency circuit 10 through a rotary phase shifting transformer 99 and phase splitting arrangement 100, a self-saturating transformer 101, or other well-known means for converting a potential of sinusoidal wave form into one of peaked wave form, and a grid transformer 102 provided with a plurality of secondary windings for introducing a component alternating potential of peaked wave form into the grid circuits of the several electric valves.

In explaining the operation of the apparatus described in Fig. 4, it will be assumed that the switch 87 is closed and that the switch 88 is in its upper position. The apparatus, including the transformer 14 and electric valves 17—20 inclusive, will operate to convert the alternating current supplied by the source 13 into higher frequency alternating current and to supply the converted current to the circuit 10, as explained above in connection with Fig. 1. During one-half cycle of the higher frequency circuit, for example, that half cycle when the upper line of the circuit 10 is positive, one of the phases of the alternating-current circuit 69 will be energized therefrom through a pair of the electric valves 70—81, inclusive. For example, the phase AB will be energized through electric valve 70, the left hand portion of reactor 82, the right-hand portion of reactor 83 and electric valve 76. During the next successive half cycle of the higher frequency current the phase AB will be energized through electric valve 74, the right-hand portion of reactor 83, the left-hand portion of reactor 82, and electric valve 80. In other words, these four valves 70, 76, 74, and 80 will act as a full wave rectifier supplying energy to the phase AB so long as their control grids are energized for rectifier operation which period, under unity power factor conditions, corresponds to one complete half cycle of the lower frequency current. In a similar manner, current will be transmitted to phases BC and CA during successive intervals of time. When the load on the circuit 69 is non-reactive it is only necessary to successively excite the grids of the several control valves at the frequency of the circuit 69. However, when operating under non-unity power factor conditions on the circuit 69, for example, with a lagging load, a simple lower frequency excitation of these valves results in turning on one group of valves for rectifier operation while current is still flowing in another group of valves, thus causing a short circuit on the apparatus, as exlained in connection with the arrangement of Fig. 3. As stated briefly above, this result is avoided in the present modification by connecting a negative bias battery 95 in the grid circuit of each of the several electric valves, and opposing this negative bias by the potential across a resistor 96, also included in the grid circuit of each of the several valves. Each of the resistors 96 is energized from a secondary winding of one of the grid transformers 92, 93, or 94 through a grid controlled electric valve 97 and the phase relations of the grid and anode potentials of the several valves are adjusted by means of the rotary phase shifting transformers 91 and 98 so that these valves are only conducting for a predetermined portion of each cycle of the potential of the lower frequency circuit 89. This portion of each cycle may be adjusted readily by means of the rotary phase shifting transformers to correspond to only that period during which the current supplied to the alternating current 69 is in phase with the potential of the circuit; that is, whenever the current is flowing against the instantaneous electromotive force of the circuit 69 none of the valves 70—81 inclusive, are excited for rectifier operation. Such an arrangement would in itself be operable but would tend to produce certain distortions and irregularities in the circuit due to the fact that the load current would flow intermittently. However, as in the arrangement of Fig. 3, by including a component of inverter excitation for each electric valve during those periods when it is not operating as a rectifier, current may flow in an opposite direction through the apparatus during those portions of each cycle of the lower frequency circuit when the current is opposed to the electromotive force of the circuit. The manner in which each of the several control grids is given these two components of excitation may be readily understood by considering the grid circuit of one of the electric valves, for example, the valve 70. The grid of the valve 70 is connected to its cathode circuit through a current limiting resistor 68, conductor 103, secondary winding 104 of grid transformer 102, conductor 105, bias resistor 96 energized from the secondary winding 106 of grid transformer 92 through electric valve 97, conductor 107 and negative bias battery 95. In a similar manner each of the several other grid circuits may be traced and will be seen to include a negative bias battery 95, a secondary winding of the grid transformer 102 for producing a higher frequency excitation of peaked wave form, and a bias resistor 96 energized from a secondary winding of one of the grid transformers 92, 93 or 94, for supplying a lower frequency component of excitation sufficient to overcome the negative bias of one of the batteries 95.

The operation of the apparatus of Fig. 4 has been explained on the assumption that the switch 88 is in its upper position, in which position it is unnecessary that the circuit 69 be provided with a source of counterelectromotive force. However, if the switch 88 be changed to its lower position so as to supply power to the circuit 89 and the machine 90 is a power generator connected to this load circuit, the lower frequency excitation for the apparatus may be obtained directly therefrom without the use of an independent pilot generator. This embodiment of my invention has been described, also, as applied to an arrangement for transmitting energy from a single-phase high frequency circuit to a polyphase low frequency circuit although it is obvious that it may be extended to a polyphase-polyphase arrangement by interconnecting each terminal of one circuit with each terminal of the other circuit through a pair of oppositely disposed electric valves.

In Fig. 5 there is illustrated a modification of my invention by means of which the amount of energy transmitted between higher frequency and lower frequency alternating-current circuits may be controlled. The power circuit of this figure is identical with Fig. 1 with the exception that the transformer winding 16 is divided into two insulated windings 16 and 16' for supplying successive half cycles of low frequency current and that the reactor 21 is replaced by reactor 21' having two mutually coupled electrically insulated windings. By this provision the number of cathode potentials of the valves 17—20 inclusive, is reduced to two. As in the arrangement of Fig. 1 the several electric valves are excited for inverter operation by means of grid transformers 27 and 27' energized from the high frequency circuit 11 through a rotary phase shifting transformer 28 and phase splitting circuit 29. In this arrangement, however, the grids of the several electric valves also receive a second component of higher frequency excitation of peaked wave form for exciting the several valves for controlled rectifier operation. As illustrated, the grids of the several electric valves 17—20 inclusive, are energized from saturable transformers 110—113 inclusive, respectively, the primary windings of which are energized from the higher frequency circuit 11 through a rotary phase shifting transformer 114 and a phase splitting circuit 115. Transformers 110—113 inclusive, are normally maintained saturated by means of the auxiliary windings 116—119 inclusive, the windings 116 and 117 being energized in series from a source of direct current, shown as a battery 120, through a resistor 121 and the windings 118 and 119 being similarly energized through a resistor 122. With the transformers thus saturated it is well understood that no potential will be induced in the secondary windings included in the grid circuits of the several electric valves and these secondary windings are in effect magnetically short circuited. In order to remove periodically the saturation of the transformers 110—113 inclusive, and thus excite the several electric valves 17 to 20 inclusive, for controlled rectifier operation, there is included in circuit with each pair of saturating windings 116 and 117, and 118 and 119, respectively, a secondary winding of the grid transformer 123. The primary winding of the transformer 123 may be energized from any suitable source of control potential of the desired frequency, such, for example, as the circuit 124; or, in case the lower frequency circuit 12 is connected to an independent source of electromotive force for determining its frequency, the primary winding of transformer 123 may be energized therefrom. The secondary windings of transformer 123 are connected in circuit with the saturating windings in such a way that the potential of the battery 120 is opposed in the circuit of the windings 116 and 117 for half cycles of the potential of the circuit 124 of one polarity, while the potential of the battery 120 in the circuit of the windings 118 and 119 is opposed during the other half cycle. If desired, current limiting resistors 125 and 126 may be connected in series with the secondary windings of the transformer 123. It is preferable also to connect unilaterally conductive devices, such for example, as contact rectifiers 127 and 128 in series with saturating windings to prevent the reversal of the saturation current in case the amplitude of the potential supplied by the transformer 123 exceeds that of the battery 120. However, this feature of turning off and on the excitation of an electric valve by saturating a grid transformer forms no part of my present invention, but is disclosed and broadly claimed in my copending application Serial No. 564,623, filed September 23, 1931, and assigned to the same assignee as the present application. Bias batteries 129 are preferably connected in the several grid circuits of the electric valves 17—20 inclusive.

The operation of the apparatus illustrated in Fig. 5 is similar in many respects to that of the apparatus of Fig. 1. For example, assume that, during a given half cycle of control potential of the circuit 124, the potential of the secondary winding of the transformer 123 opposes the potential of the battery 120 in the circuit of the windings 116 and 117 with the result that the transformers 110 and 111 becomes desaturated. As stated above, the presence of the contact rectifier 127 will prevent the reversal of the saturating current tending to saturate the transformers with an opposite magnetic polarity in case the amplitude of the control potential should exceed that of the battery 120. An alternating potential of peaked wave form will now be impressed upon the grids of the valves 17 and 19 from the transformers 110 and 111, the primary windings of which are energized from the higher frequency circuit 11. The valves 17 and 19 now operate as a controlled rectifier supplying unidirectional potential to the lower frequency circuit 12. During this same interval the transformers 112 and 113 are completely saturated so that no rectifier excitation is supplied to the valves 18 and 20, but these valves are supplied with a higher frequency alternating potential of peaked wave form for inverter operation by means of the transformer 27'. Under these conditions the apparatus will operate to supply energy of any desired power factor to the lower frequency circuit 12 as explained in more detail in connection with Fig. 1. During the next half cycle of lower frequency control potential, transformers 110 and 111 will become saturated, while transformers 112 and 113 will be desaturated so that the valves 18 and 20 will be excited for controlled rectifier operation to supply unidirectional potential to the lower frequency circuit 12 while the valves 17 and 19 will be excited for inverter operation. In this manner, successive half cycles of lower frequency current will be supplied to the circuit 12 from the two pairs of electric valves 17 and 19, and 18 and 20. As is well understood by those skilled in the art, if the phase of the rectifier excitation supplied by the transformers 110—113 inclusive, is varied by means of the rotary phase shifting transformer 114, the average unidirectional potential impressed upon the low frequency circuit 12 by the two controlled rectifiers during successive half cycles of lower frequency current may be controlled to any desired value. Obviously the amount of energy transmitted to the lower frequency circuit 12 may thus be controlled by controlling the average potential impressed thereupon from the higher frequency circuit. The control of the phase of the rectifier excitation also makes it possible to prevent any circulating current between the valves excited for rectifier operation and those excited for inverter operation due to the lower inverter voltage occasioned by introducing the proper commutating angle in the inverter excitation.

The arrangement of Fig. 6 is similar to that of Fig. 5 with the exception that the rectifier excitation of the two pairs of electric valves is alternately electrically short circuited rather than magnetically short circuited by saturating the grid transformers. For example, the valves 17—19 are supplied with rectifier excitation from the secondary windings 131 and 132 of grid transformer 130, and valves 18 and 20 are supplied with rectifier excitation from secondary windings 133 and 134 of grid transformer 135, the primary windings of transformers 130 and 135 being energized from the higher frequency circuit 11 through the phase shifting transformer 114 as in the arrangement of Fig. 5. The windings 131—134 inclusive, are adapted to be electrically short circuited through electric valves 136—139 inclusive, the grids of the pairs of valves 136 and 137, and 138 and 139 being rendered alternately positive by means of the lower frequency excitation derived from the control circuit 124. However, it will be obvious to those skilled in the art that the rectifier excitation may be removed by open circuiting it rather than short circuiting it, as illustrated. Negative bias batteries 140 and 141 are included in the grid circuits of the valves 17 and 19, and 18 and 20, respectively, and a portion of these bias batteries may be included in the anode-cathode circuits of the auxiliary electric valves 136—139 inclusive, as indicated, in order to insure that the currents in these valves are interrupted when the lower frequency excitation passes through zero. As illustrated, the grids of the auxiliary electric valves are also given a slight positive bias by means of intermediate connections to the batteries 140 and 141 to make certain that they are conductive for complete half cycles of lower frequency excitation. In other respects, the operation of this last described apparatus is similar to that described in connection with Fig. 5. It will be obvious to those skilled in the art that any of the several types of grid excitation described above is equally applicable to any of the several illustrated power circuits for transmitting energy between alternating-current circuits of different frequencies.

While I have described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In an electric valve converting system, the combination of an alternating-current supply circuit, an alternating-current load circuit, said circuits being of substantially different frequencies, a plurality of groups of electric valves for transmitting energy therebetween, means for exciting a group of said valves for transmitting energy from said supply circuit to said load circuit, and means for simultaneously exciting another group of said valves for transmitting energy in an opposite direction to enable said apparatus to supply reactive loads.

2. In an electric valve converting system, the combination of an alternating-current supply circuit, an alternating-current load circuit, said circuits being of substantially different frequencies, a plurality of groups of electric valves for transmitting energy therebetween, means for exciting one of said groups of valves for rectifier operation to transmit energy from the higher frequency circuit to the lower frequency circuit, and means for simultaneously exciting another group of valves for inverter operation to transmit energy from the lower frequency circuit to the higher frequency circuit whereby energy may be transmitted between said circuits under any desired power factor conditions on said load circuit.

3. In an electric valve converting system, the combination of an alternating-current supply circuit, an alternating-current load circuit of substantially lower frequency, a plurality of groups of electric valves for transmitting energy therebetween, means for successively exciting said groups of valves for rectifier operation to transmit energy from said supply circuit to said load circuit, and means for exciting for inverter operation all of said valves except those excited for rectifier operation whereby energy may be transmitted between said circuits under non-unity power factor conditions on said alternating current circuit.

4. In an electric valve converting system, the combination of a higher frequency alternating-current supply circuit, a lower frequency alternating-current load circuit, a plurality of groups of electric valves for transmitting energy therebetween, each of said valves being provided with a control grid, means for energizing said control grids with a component of said lower frequency alternating potential to excite successively said groups of valves for rectifier operation, and means for superposing upon said lower frequency potential a component of said higher frequency alternating potential of peaked wave form to excite said valves for inverter operation when not excited for rectifier operation.

5. In an electric valve converting system, the combination of a higher frequency alternating-current supply circuit, a lower frequency alternating-current load circuit, two groups of electric valves for transmitting energy therebetween, each of said valves being provided with a control grid and said groups of valves being oppositely disposed with respect to said load circuit, means for energizing said control grids with a component of said lower frequency alternating potential to excite successively said groups of valves for rectifier operation, said groups of valves supplying half cycles of load current of opposite polarity, and means for superposing upon said lower frequency component a component of said higher frequency alternating potential of peaked wave form to excite for inverter operation the group of valves not excited for rectifier operation.

6. In an electric valve converting system, the combination of a higher frequency alternating-current supply circuit, a lower frequency alternating-current load circuit, two groups of electric valves for transmitting energy therebetween, said groups of valves being oppositely disposed with respect to said load circuit, means for successively exciting said groups of valves for rectifier operation to supply alternate half cycles of current to said load circuit, means for exciting for inverter operation all of said valves except those excited for rectifier operation whereby energy may be transmitted between said circuit under non-unity power factor conditions on said alternating-current circuit, and mutually coupled reactances included in circuit with said groups of valves substantially to eliminate momentary short circuits due to the simultaneous operation of both groups of valves as rectifiers.

7. In an electric valve converting system, the combination of a higher frequency alternating-current supply circuit, a lower frequency alternating-current load circuit, a plurality of groups of electric valves for transmitting energy therebetween, means for successively exciting said groups of valves for rectifier operation to supply successive half cycles of opposite polarity to said lower frequency circuit, and means for limiting said rectifier excitation of each group of valves to that portion of the corresponding half cycles of lower frequency current in which said current flows in opposition to the counter-electromotive force of the load circuit.

8. In an electric valve converting system, the combination of a higher frequency alternating current supply circuit, a lower frequency alternating-current load circuit, a plurality of groups of electric valves for transmitting energy therebetween, each of said valves being provided with a control grid, means for impressing upon said control grids a negative bias potential and an alternating potential of said higher frequency and of peaked wave form, whereby said valves are normally excited for inverter operation to transmit energy from said lower frequency circuit to said higher frequency circuit, and means for periodically and successively overcoming the negative grid bias of said groups of valves with a positive bias at the frequency of said lower frequency circuit, whereby said groups of valves are successively excited for rectifier operation to transmit energy from said higher frequency circuit to said lower frequency circuit.

9. An electric valve frequency changing system comprising a higher frequency alternating-current supply circuit, a lower frequency alternating-current load circuit, a plurality of groups of electric valves for transmitting energy therebetween, each of said valves being provided with a control grid, means for impressing upon said control grids a negative bias potential and an alternating potential of said higher frequency and of peaked wave form, whereby said valves are normally excited for inverter operation to transmit energy from said lower frequency circuit to said higher frequency circuit, means for periodically and successively overcoming the negative grid bias of said groups of valves with a positive bias at the frequency of said lower frequency circuit, whereby said groups of valves are successively excited for rectifier operation to transmit energy from said higher frequency circuit to said lower frequency circuit, and means for holding off said positive bias from the grids of each group of electric valves during those portions of each cycle of lower frequency current in which said current flows with the counter-electromotive force of said lower frequency circuit.

10. An electric valve frequency changing system comprising a higher frequency alternating-current supply circuit, a lower frequency alternating-current load circuit, a plurality of groups of electric valves for transmitting energy therebetween, each of said valves being provided with a control grid, means for impressing upon said control grids a negative bias potential and an alternating potential of said higher frequency and of peaked wave form, whereby said valves are normally excited for inverter operation to transmit energy from said lower frequency circuit to said higher frequency circuit, impedance elements included in the grid circuits of said valves, a plurality of auxiliary rectifier valves, and means for energizing each of said impedance elements from said lower frequency circuit through a rectifier valve, whereby the negative grid biases of said groups of valves are successively overcome by the positive drop of said impedances to excite successively said groups of valves for rectifier operation.

11. An electric valve frequency changing system comprising a higher frequency alternating-current supply circuit, a lower frequency alternating-current load circuit, a plurality of groups of electric valves for transmitting energy therebetween, each of said valves being provided with a control grid, means for impressing upon said control grids a negative bias potential and an alternating potential of said higher frequency and of peaked wave form, whereby said valves are normally excited for inverter operation to transmit energy from said lower frequency circuit to said higher frequency circuit independent impedance means for the grid circuits of each of said groups of valves, auxiliary electric valve means for energizing said impedance means from said lower frequency circuit whereby the negative grid biases of said groups of valves are successively overcome by the positive drop of said impedances successively to excite said groups of valves for rectifier operation, and means responsive to current in each group of valves for maintaining non-conductive the auxiliary valve means associated with the other group of valves.

12. An electric valve frequency changing system comprising a higher frequency alternating-current supply circuit, a lower frequency alternating-current load circuit, a plurality of groups of electric valves for transmitting energy therebetween, each of said valves being provided with a control grid, means for impressing upon said grids a negative bias potential and an alternating potential of said higher frequency and of peaked wave form, whereby said valves are normally excited for inverter operation to transmit energy from said lower frequency circuit to said higher frequency circuit, an impedance means in the grid circuit of each of said valves, a plurality of auxiliary electric valves, each provided with a control grid, means for energizing each impedance element through one of said auxiliary valves with a lower frequency alternating potential, means for impressing an alternating potential of said lower frequency upon the control grids of said auxiliary valves, and means for independently varying the phase of said lower frequency potentials impressed upon said auxiliary electric valves and their grids whereby their periods of conductivity may be limited to any desired portion of the cycles of lower frequency potential, the negative grid biases of said groups of valves being overcome during such periods by the positive drop in said impedance elements to excite successively said groups of valves for rectifier operation.

13. In an electric valve converting system, the combination of a higher frequency alternating-current supply circuit, a lower frequency alternating-current load circuit, a plurality of groups of electric valves for transmitting energy therebetween, means for normally exciting all of said valves for inverter operation, means for exciting all of said valves for rectifier operation, and means for successively removing the rectifier excitation from said groups of valves whereby the load current is successively transferred between the groups of valves.

14. In an electric valve converting system, the combination of a higher frequency alternating-current supply circuit, a lower frequency alternating-current load circuit, a plurality of groups of electric valves for transmitting energy therebetween, each of said valves being provided with a control grid, means for energizing said control grids with a component of said higher frequency potential of peaked wave form to excite said valves normally for inverter operation, means for superposing upon said grid excitation a second component of said higher frequency potential of peaked wave form to excite said valves for rectifier operation, means for varying the phase of said second component to control the average potential impressed upon said load circuit, and means for successively short circuiting said rectifier component of excitation of said groups of valves at the frequency of said load circuit whereby the load current is successively transferred between said groups of valves.

15. In an electric valve converting system, the combination of a higher frequency alternating-current supply circuit, a lower frequency alternating-current load circuit, a plurality of groups of electric valves for transmitting energy therebetween, each of said valves being provided with a control grid, means for energizing said control grids with a component of said higher frequency potential of peaked wave form for normally exciting said valves for inverter operation, a saturable core transformer winding included in the grid circuit of each of said valves, means for inducing in said transformer windings a higher frequency alternating potential for exciting said valves for rectifier operation, means for normally saturating the cores of said windings to short circuit magnetically said rectifier excitation, and means for successively neutralizing said normal saturation of the transformer cores associated with said groups of valves at the frequency of said load circuit whereby the load current is successively transferred between said groups of valves.

16. In an electric valve converting system, the combination of a higher frequency alternating-current supply circuit, a lower frequency alternating-current load circuit, a plurality of groups of electric valves for transmitting energy therebetween, each of said valves being provided with a control grid, means for energizing said control grids with a component of said higher frequency potential of peaked wave form for normally exciting said valves for inverter operation, a plurality of grid transformers each provided with a primary winding energized from said higher frequency circuit, a secondary winding, a saturable core and a saturating winding, one of said secondary windings being included in the grid circuit of each of said valves for exciting said valves for rectifier operation, means for normally energizing the saturating windings of said transformer cores to short circuit magnetically said rectifier excitation, and circuits for opposing the energization of said saturating windings with the potential of said lower frequency circuit so that said groups of valves are successively excited for rectifier operation.

17. In an electric valve converting system, the combination of a pair of alternating current circuits of different frequencies, a plurality of groups of electric valves interconnecting said circuits, means for successively rendering conductive said groups of valves to transmit energy between said circuits, and means for limiting the circulating current through the apparatus occasioned by the failure of an electric valve or by the simultaneous operation of more than one group of valves as rectifiers comprising a reactance device interconnecting said groups of valves.

18. In an electric valve converting system, the combination of a pair of alternating current circuits of different frequencies, a plurality of groups of electric valves interconnecting said circuits, means for successively rendering conductive said groups of valves to transmit energy between said circuits, and means for limiting the circulating current through the apparatus occasioned by the failure of an electric valve or by the simultaneous operation of more than one group of valves as rectifiers comprising mutually coupled reactance devices in circuit with said groups of valves.

19. In an electric valve converting system, the combination of an alternating current supply circuit, an alternating current load circuit, said circuits being of substantially different frequencies, a transformer network provided with an electrical neutral connected to one side of said load circuits, two groups of oppositely connected electric valves interconnecting the terminals of said network with the other side of said load circuit, and a reactance device provided with an electrical midpoint connected to the latter side of said load circuit interposed in the connections to said groups of valves.

20. In an electric valve converting system, the combination of a supply circuit, an alternating current load circuit, a pair of groups of electric valves for transmitting energy therebetween, means for exciting one of said groups of valves to transmit energy from said supply circuit to said load circuit, means for simultaneously exciting the other of said groups of valves to transmit energy from said load circuit to said supply circuit under reactive power factor conditions on said load circuit, and mutually coupled inductive windings in circuit with said groups of valves.

21. In an electric valve converting system, the combination of an alternating current supply circuit, an independent alternating current load circuit, a plurality of grid controlled electric valves for transmitting energy therebetween, means for exciting the grids of said valves with a periodic potential of the frequency of said load circuit to control the direction of current flow in the load circuit, means for exciting the grids of said valves with a periodic potential of the frequency of said supply circuit, and means for controlling the last mentioned grid excitation to control the energy transmitted beween said circuits.

22. In an electric valve converting system, the combination of an alternating current supply circuit, an alternating current load circuit, a plurality of grid controlled electric valves for transmitting energy therebetween, means for exciting the grids of said valves with an alternating potential of the frequency of said load circuit to commutate the current between the several terminals of said load circuit, means for exciting said grids with an alternating potential of the frequency of said supply circuit, and means for varying the phase of said last mentioned grid potential to control the energy transmitted between said circuits.

BURNICE D. BEDFORD.